US010813526B2

(12) United States Patent
Feddema et al.

(10) Patent No.: US 10,813,526 B2
(45) Date of Patent: Oct. 27, 2020

(54) DISHWASHER WITH WATER VALVE HAVING VOLUMETRIC FLOW CONTROL

(71) Applicant: Whirlpool Corporation, Benton Harbor, MI (US)

(72) Inventors: Mark S. Feddema, Kalamazoo, MI (US); Elliott V. Stowe, Stevensville, MI (US); Mohan Takale, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/374,801

(22) Filed: Apr. 4, 2019

(65) Prior Publication Data

US 2019/0223684 A1 Jul. 25, 2019

Related U.S. Application Data

(63) Continuation of application No. 15/224,824, filed on Aug. 1, 2016, now Pat. No. 10,292,565.

(51) Int. Cl.
*A47L 15/42* (2006.01)
*A47L 15/50* (2006.01)
(Continued)

(52) U.S. Cl.
CPC ........... *A47L 15/4217* (2013.01); *A47L 15/16* (2013.01); *A47L 15/22* (2013.01); *A47L 15/4244* (2013.01);
(Continued)

(58) Field of Classification Search
CPC .. A47L 15/4217; A47L 15/507; A47L 15/502; A47L 15/22; A47L 15/16;
(Continued)

(56) References Cited

U.S. PATENT DOCUMENTS 3,692,043 A 9/1972 Waskowsky
4,256,136 A * 3/1981 Crawford ............ A47L 15/4244
134/56 D
(Continued)

FOREIGN PATENT DOCUMENTS

DE 3540977 A1 5/1987
DE 4425773 C1 2/1996
(Continued)

OTHER PUBLICATIONS

Machine Translation of DE 19630357 to Schrott, Feb. 1998. (Year: 2018).
(Continued)

*Primary Examiner* — Benjamin L Osterhout
(74) *Attorney, Agent, or Firm* — McGarry Bair PC

(57) ABSTRACT

A dishwasher has a treating chamber for receiving dishes for treatment according to an automatic cycle of operation and a dispensing system for storing and dispensing a treating chemistry to the treating chamber during the cycle of operation. The dishwasher may dispense a treating chemistry when a temperature of a liquid in the treating chamber satisfies a predetermined temperature threshold. The temperature of the liquid may be maintained to satisfy the predetermined temperature threshold for a predetermined period of time based on the treating chemistry.

19 Claims, 5 Drawing Sheets

(51) Int. Cl.

| | | |
|---|---|---|
| *G01F 1/075* | (2006.01) | |
| *G01F 1/115* | (2006.01) | |
| *A47L 15/44* | (2006.01) | |
| *A47L 15/16* | (2006.01) | |
| *A47L 15/22* | (2006.01) | |
| *G01F 15/00* | (2006.01) | |
| *A47L 15/00* | (2006.01) | |

(52) U.S. Cl.
CPC ....... *A47L 15/4261* (2013.01); *A47L 15/4287* (2013.01); *A47L 15/4297* (2013.01); *A47L 15/4463* (2013.01); *A47L 15/502* (2013.01); *A47L 15/507* (2013.01); *G01F 1/075* (2013.01); *G01F 1/115* (2013.01); *G01F 15/001* (2013.01); *G01F 15/003* (2013.01); *G01F 15/005* (2013.01); *A47L 15/0049* (2013.01); *A47L 2401/14* (2013.01); *A47L 2501/01* (2013.01)

(58) Field of Classification Search
CPC ............. A47L 15/4463; A47L 15/4287; A47L 15/4297; A47L 15/4244; A47L 15/4261; A47L 2401/14; A47L 2501/01; A47L 15/0049; G01F 15/005; G01F 1/075; G01F 1/115; G01F 15/001; G01F 15/003
See application file for complete search history.

(56) References Cited

U.S. PATENT DOCUMENTS

| | | | |
|---|---|---|---|
| 4,522,229 A | 6/1985 | Van de Moortele | |
| 5,007,453 A | 4/1991 | Berkowitz et al. | |
| 5,458,152 A | 10/1995 | Goehner et al. | |
| 6,766,812 B1 | 7/2004 | Gadini | |
| 6,823,878 B1 | 11/2004 | Gadini | |
| 6,837,271 B1 | 1/2005 | Saint | |
| 6,887,318 B2 | 5/2005 | Bashark | |
| 8,640,729 B2 | 2/2014 | Dana | |
| 9,145,976 B2 * | 9/2015 | Tarr | A47L 15/4217 |
| 2001/0003286 A1 | 6/2001 | Philippbar et al. | |
| 2003/0205248 A1 | 11/2003 | Christman et al. | |
| 2005/0236019 A1 | 10/2005 | Bang | |
| 2005/0241675 A1 | 11/2005 | Jung et al. | |
| 2005/0258258 A1 | 11/2005 | Jonte | |
| 2005/0268969 A1 | 12/2005 | Zakai et al. | |
| 2006/0000511 A1 | 1/2006 | Shade et al. | |
| 2008/0048142 A1 | 2/2008 | Engler et al. | |
| 2009/0056757 A1 | 3/2009 | Son et al. | |
| 2011/0284104 A1 | 11/2011 | Riano Gutierrez | |
| 2014/0312254 A1 | 10/2014 | Molino et al. | |
| 2015/0068565 A1 | 3/2015 | Lee et al. | |

FOREIGN PATENT DOCUMENTS

| | | |
|---|---|---|
| DE | 19630357 A1 | 2/1998 |
| EP | 0235766 A2 | 9/1987 |
| EP | 0599341 A3 | 6/1994 |
| EP | 1930509 A1 | 6/2008 |
| EP | 1545283 B1 | 11/2011 |
| GB | 2055454 A | 3/1981 |
| JP | 2010231331 A | 10/2010 |
| WO | 2006033562 A1 | 3/2006 |

OTHER PUBLICATIONS

Machine Translation of EP 1930509 to Melcher et al., Oct. 2005. (Year: 2018).
www.eltekgroup.it, Water Block, part No. # 100041, printed Dec. 17, 2015.

* cited by examiner

DISHWASHER WITH WATER VALVE HAVING VOLUMETRIC FLOW CONTROL

CROSS-REFERENCE TO RELATED APPLICATION(S)

This application is a continuation of U.S. patent application Ser. No. 15/224,824, filed Aug. 1, 2016, now U.S. Pat. No. 10,292,565, issued May 21, 2019, which is incorporated herein by reference in its entirety.

BACKGROUND

Contemporary automatic dishwashers for use in a typical household include a tub and at least one rack or basket for supporting soiled dishes within the tub. A spraying system with multiple sprayers can be provided for recirculating liquid throughout the tub to remove soils from the dishes. The spraying system can include various sprayers including a rotatable sprayer. The various sprayers can be selectively supplied with liquid via a water supply circuit. The water supply circuit can have a conduit with an inlet that connects to the household water supply in order to selectively supply water to the dishwasher for treating soiled dishes within the tub. The conduit coupling the water supply inlet to the tub can be provided with an actuatable valve to selectively control liquid flow through the conduit. Malfunction or failure of the valve to shut off the flow of water through the valve can result in excess water flowing into the tub of the dishwasher.

BRIEF DESCRIPTION

The disclosure relates to a method of supplying water to a dishwasher operable according to an automatic cycle of operation, the method comprising: supplying water to a tub of the dishwasher through a valve with a mechanically actuated flow limiter; and shutting off the flow of water without the use of electricity after the mechanically actuated flow limit determines the passing of a predetermined volume of water through the valve.

The disclosure further relates to a method of supplying water to an appliance operable according to an automatic cycle of operation, the method comprising: supplying water to the appliance through a valve with a mechanically actuated flow limiter; and shutting off the flow of water without the use of electricity after the mechanically actuated flow limit determines the passing of a predetermined volume of water through the valve.

DESCRIPTION OF EMBODIMENTS OF THE INVENTION

Figure 1:
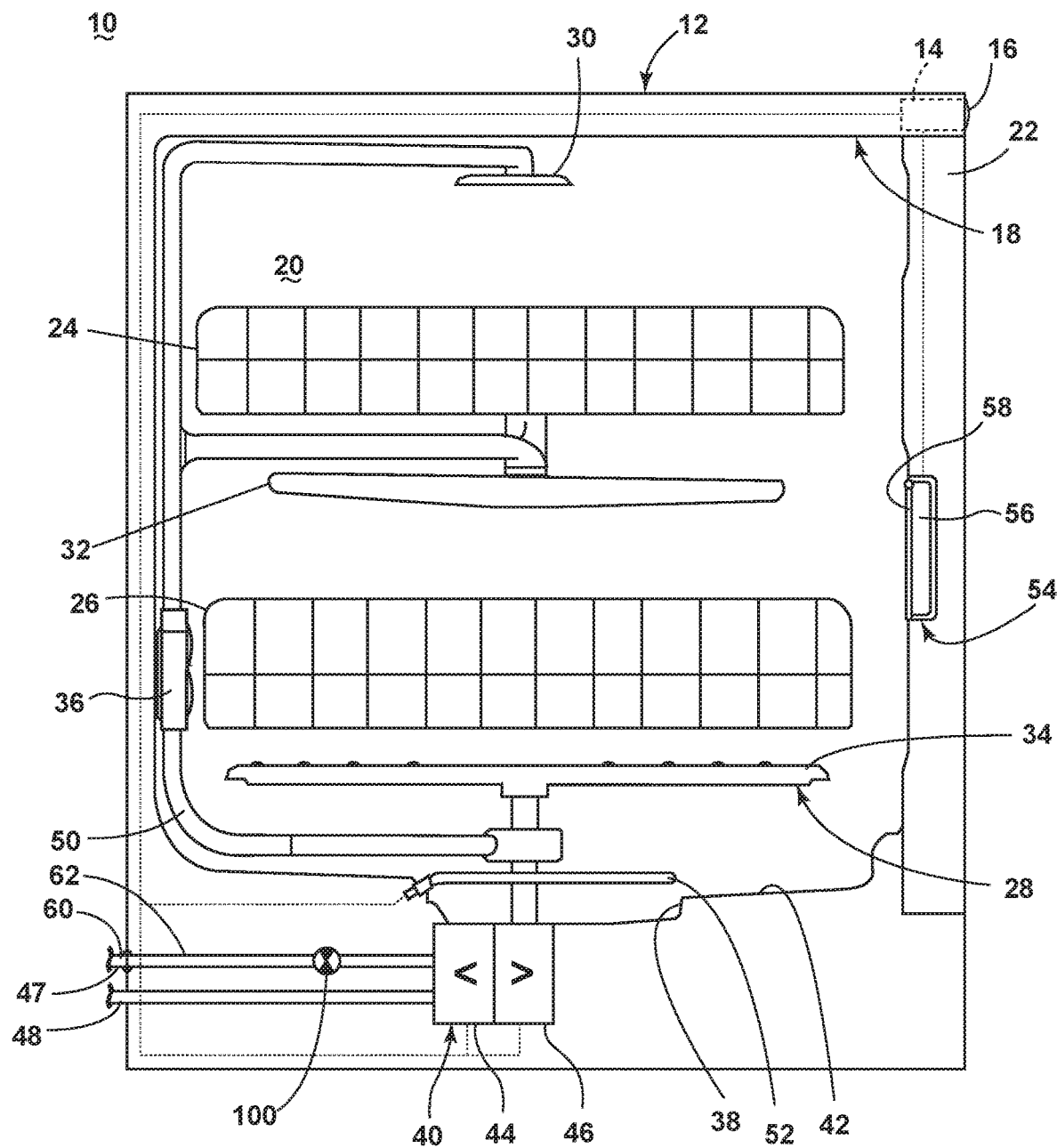
FIG. 1 is a schematic, side view of a dishwasher according to an embodiment of the invention.

FIG. 1 is a schematic, side view of a dishwasher 10 for treating dishes according to an automatic cycle of operation, according to an embodiment of the invention. In FIG. 1, the dishwasher 10 includes a chassis 12 defining an interior. Depending on whether the dishwasher 10 is a stand-alone or built-in dishwasher, the chassis 12 may be a frame with or without panels attached, respectively. The dishwasher 10 shares many features of a conventional automatic dishwasher, which will not be described in detail herein except as necessary for a complete understanding of the invention. While the present invention is described in terms of a conventional dishwashing unit, it could also be implemented in other types of dishwashing units, such as in-sink dishwashers, multi-tub dishwashers, or drawer-type dishwashers.

A controller 14 may be located within the chassis 12 and may be operably coupled with various components of the dishwasher 10 to implement one or more cycles of operation. A control panel or user interface 16 may be provided on the dishwasher 10 and coupled with the controller 14. The user interface 16 may be provided on the chassis 12 or on the outer panel of the door 22 and can include operational controls such as dials, lights, switches, and displays enabling a user to input commands, such as a cycle of operation, to the controller 14 and receive information about the selected cycle of operation.

A tub 18 is located within the interior of and mounted to the chassis 12 and at least partially defines a treating chamber 20 with an access opening in the form of an open face. A cover, illustrated as a door 22, may be hingedly mounted to the chassis 12 and may selectively move between an opened position, wherein the user may access the treating chamber 20, and a closed position, as shown in FIG. 1, wherein the door 22 covers or closes the open face of the treating chamber 20.

Dish holders in the form of upper and lower racks 24, 26 are located within the treating chamber 20 and receive dishes for being treated. The racks 24, 26 are mounted for slidable movement in and out of the treating chamber 20 for ease of loading and unloading. As used in this description, the term "dish(es)" is intended to be generic to any item, single or plural, that may be treated in the dishwasher 10, including, without limitation; dishes, plates, pots, bowls, pans, glassware, silverware, and other utensils. While not shown, additional dish holders, such as a silverware basket on the interior of the door 22 or a third level rack above the upper rack 24 may also be provided.

A spraying system 28 may be provided for spraying liquid into the treating chamber 20 and is illustrated in the form of an upper sprayer 30, a mid-level sprayer 32, a lower sprayer 34, and a spray manifold 36. The upper sprayer 30 may be located above the upper rack 24 and is illustrated as a fixed spray nozzle that sprays liquid downwardly within the treating chamber 20. Mid-level sprayer 32 and lower sprayer 34 are located beneath upper rack 24 and lower rack 26, respectively, and are illustrated as rotating spray arms. The mid-level sprayer 32 may provide a liquid spray upwardly through the bottom of the upper rack 24. The lower sprayer 34 may provide a liquid spray upwardly through the bottom of the lower rack 26. The mid-level sprayer 32 may optionally also provide a liquid spray downwardly onto the lower rack 26, but for purposes of simplification, this will not be illustrated herein.

The spray manifold 36 may be fixedly mounted to the tub 18 adjacent to the lower rack 26 and may provide a liquid spray laterally through a side of the lower rack 26. The spray manifold 36 may not be limited to this position; rather, the spray manifold 36 may be located in any suitable part of the treating chamber 20. While not illustrated herein, the spray manifold 36 may include multiple spray nozzles having apertures configured to spray wash liquid towards the lower rack 26. The spray nozzles may be fixed or rotatable with respect to the tub 18. Suitable spray manifolds are set forth in detail in U.S. Pat. No. 7,445,013, filed Jun. 17, 2003, and titled "Multiple Wash Zone Dishwasher," and U.S. Pat. No. 7,523,758, filed Dec. 30, 2004, and titled "Dishwasher Having Rotating Zone Wash Sprayer," both of which are incorporated herein by reference in their entirety. Instead of or in addition to the spray manifold 36 provided on the rear wall, nozzles can be provided on the right and left side walls of the tub 18.

A liquid recirculation system may be provided for recirculating liquid from the treating chamber 20 to the spraying system 28. The recirculation system may include a sump 38 and a pump assembly 40. The sump 38 collects the liquid sprayed in the treating chamber 20 and may be formed by a sloped or recess portion of a bottom wall 42 of the tub 18. The pump assembly 40 may include both a drain pump 44 and a recirculation pump 46.

The liquid recirculation system may also be fluidly coupled with a water supply line 47 for receiving fresh water from a water supply source, such as a household water supply, as well as a water supply circuit. The water supply circuit comprises a household inlet fitting 60, which is carried by the chassis 12, a conduit 62 that fluidly couples the inlet fitting 60 to the tub 18, and an actuatable valve 100. The actuatable valve 100 selectively controls the flow of liquid through the conduit 62, allowing the flow of liquid from the conduit 62 into the tub 18 when the actuatable valve 100 is in an opened position, and preventing the flow of liquid from the conduit 62 into the tub 18 when the actuatable valve 100 is in a closed position.

The drain pump 44 may draw liquid from the sump 38 and pump the liquid out of the dishwasher 10 to a household drain line 48. The recirculation pump 46 may draw liquid from the sump 38 and pump the liquid through the spray system 28 to supply liquid into the treating chamber 20 through a supply tube 50 to one or more of the sprayers 30, 32, 34, 36. In this manner, liquid may circulate from the sump 38 through the liquid recirculation system to the spray system 28 and back to the sump 38 to define a liquid recirculation circuit or flow path.

While the pump assembly 40 is illustrated as having separate drain and recirculation pumps 44, 46 in an alternative embodiment, the pump assembly 40 may include a single pump configured to selectively supply wash liquid to either the spraying system 28 or the drain line 48, such as by configuring the pump to rotate in opposite directions, or by providing a suitable valve system.

A heating system having a heater 52 may be located within or near the sump 38 for heating liquid contained in the sump 38. The heater 52 may also heat air contained in the treating chamber 20. Alternatively, a separate heating element (not shown) can be provided for heating the air circulated through the treating chamber 20. A filtering system (not shown) may be fluidly coupled with the recirculation flow path for filtering the recirculated liquid.

A user-accessible dispensing system may be provided for storing and dispensing one or more treating chemistries to the treating chamber 20. As shown herein, the user-accessible dispensing system may include a dispenser 54 mounted on an inside surface of the door 22 such that the dispenser 54 is disposed in the treating chamber 20 when the door 22 is in the closed position. The dispenser 54 is configured to dispense treating chemistry to the dishes within the treating chamber 20. The dispenser 54 may have one or more compartments 56 closed by a door 58 on the inner surface of the door 22. The dispenser 54 may be a single use dispenser which holds a single dose of treating chemistry, a bulk dispenser which holds a bulk supply of treating chemistry and which is adapted to dispense a dose of treating chemistry from the bulk supply during a cycle of operation, or a combination of both a single use and bulk dispenser.

The dispenser 54 may further be configured to hold multiple different treating chemistries. For example, the dispenser 54 may have multiple compartments defining different chambers in which treating chemistries may be held. While shown as being disposed on the door 22, other locations of the dispenser 54 are possible. However, the dispenser 54 is positioned to be accessed by the user for refilling of the dispenser 54, whether it is necessary to refill the dispenser 54 before each cycle (i.e. for a single user dispenser) or only periodically (i.e. for a bulk dispenser).

Figure 2:
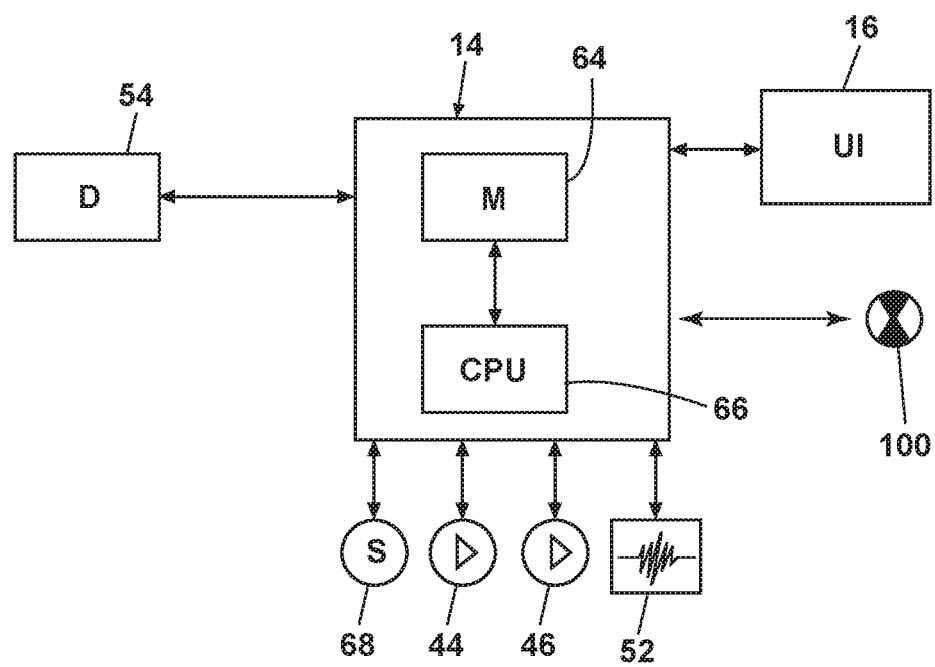
FIG. 2 is a schematic view of a controller of the dishwasher of FIG. 1.

FIG. 2 is a schematic view of the controller 14 of the dishwasher 10 of FIG. 1. As illustrated schematically in FIG. 2, the controller 14 may be coupled with the heater 52 for heating the wash liquid during a cycle of operation, the drain pump 44 for draining liquid from the treating chamber 20, the recirculation pump 46 for recirculating the wash liquid during the cycle of operation, the user-accessible dispenser 54 for selectively dispensing treating chemistry to the treating chamber 20, and the actuatable valve 100 to selectively control the flow of liquid through the conduit 62 into the tub 18.

The controller 14 may be provided with a memory 64 and a central processing unit (CPU) 66. The memory 64 may be used for storing control software that may be executed by the CPU 66 in completing a cycle of operation using the dishwasher 10 and any additional software. For example, the memory 64 may store one or more pre-programmed cycles of operation that may be selected by a user and completed by the dishwasher 10. A cycle of operation for the dishwasher 10 may include one or more of the following steps: a wash step, a rinse step, and a drying step. The wash step may further include a pre-wash step and a main wash step. The rinse step may also include multiple steps such as one or more additional rinsing steps performed in addition to a first rinsing. The amounts of water and/or rinse aid used during each of the multiple rinse steps may be varied. The drying step may have a non-heated drying step (so called "air only"), a heated drying step or a combination thereof. These multiple steps may also be performed by the dishwasher 10 in any desired combination.

The controller 14 may also receive input from one or more sensors 68. Non-limiting examples of sensors 68 that may be communicably coupled with the controller 14 include a temperature sensor and turbidity sensor to determine the soil load associated with a selected grouping of dishes, such as the dishes associated with a particular area of the treating chamber 20.

Figure 3:
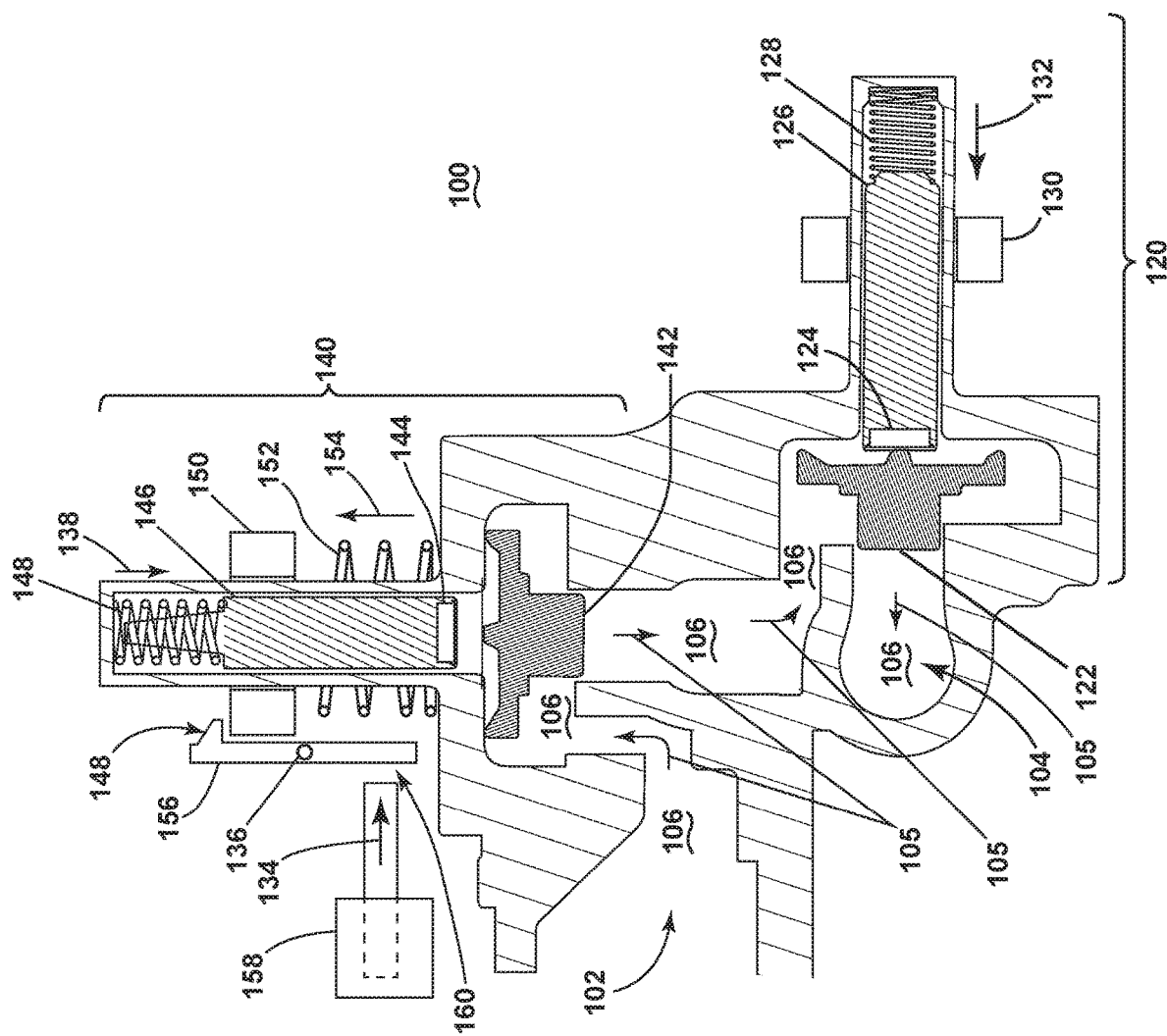
FIG. 3 is a schematic, cross-sectional view of an actuatable valve for use in the dishwasher of FIG. 1 according to a first embodiment of the invention.

Referring now to FIG. 3, a schematic, cross-sectional view of an actuatable valve 100 according to a first embodiment of the invention is illustrated. The actuatable valve 100 selectively controls the flow of liquid through the conduit 62 into the tub 18 of the dishwasher 10. The actuatable valve 100 has an inlet 102 that is fluidly coupled with the conduit 62 and allows liquid to enter the actuatable valve 100. The liquid that enters through the inlet 102 can follow a flow path 105 defined by the interior 106 of the actuatable valve 100 to reach an outlet 104. The outlet 104 is fluidly coupled with the tub 18 of the dishwasher 10 such that liquid that passes through the outlet 104 of the actuatable valve 100 can then enter the tub 18.

The actuatable valve 100 comprises a first actuatable mechanism 120 and a second actuatable mechanism 140. Both the first actuatable mechanism 120 and the second actuatable mechanism 140 can selectively control the flow of liquid through the actuatable valve 100 and into the tub 18. The first actuatable mechanism 120 comprises a stopper 122, a plunger 124, and a slidable shaft 126. The stopper 122 is positioned such that it can selectively allow liquid present within the interior 106 of the actuatable valve 100 to reach the outlet 104 of the actuatable valve 100. The stopper 122 is mounted to the plunger 124. The plunger 124 is mounted to the slidable shaft 126. The slidable shaft 126 can be actuated between an opened position (not shown) and a closed position (FIG. 3) to selectively allow the flow of liquid through the outlet 104 of the actuatable valve 100. A return spring 128 attaches to the slidable shaft 126 and exerts its force in the direction of the arrow 132, biasing the slidable shaft 126, and thus the plunger 124 and stopper 122 as well, to the closed position in which liquid that enters the actuatable valve 100 cannot pass through the interior 106 of the actuatable valve 100 in order to exit through the outlet 104. An electrically energizable coil 130 is provided circumferentially about the slidable shaft 126. The coil 130 can be selectively electrically energized by the controller 14 in order to create a magnetic field to effect the movement of the slidable shaft 126.

The actuatable valve 100 can also be provided with a second actuatable mechanism 140 that can function as a failsafe in the case that the first actuatable mechanism 120 does not function properly and allows too much liquid to flow to the outlet 104 of the actuatable valve 100. The second actuatable mechanism 140 comprises a stopper 142, a plunger 144, and a slidable shaft 146 arranged in the same structure as in the first actuatable mechanism 120. The second actuatable mechanism 140 is also provided with a return spring 148 that exerts its force in the direction of the arrow 138, biasing the slidable shaft 146, the plunger 144, and the stopper 142 to a closed, or actuating, position which prevents the flow of liquid through the interior 106 of the actuatable valve 100. A rare earth magnet 150 is provided circumferentially about the slidable shaft 146. The earth magnet 150 is movable along the length of the slidable shaft 146 between an actuating position (not shown) and a non-actuating position (FIG. 3) and can effect movement of the slidable shaft 146. A spring 152 is provided circumferentially about the slidable shaft 126 and exerts its force in the direction of the arrow 154 to apply pressure against the earth magnet 150 and bias the moveable earth magnet 150 from the non-actuating position to the actuating position. A release 156 is also provided adjacent the earth magnet 150 that holds the earth magnet 150 in the non-actuating position.

The actuatable valve 100 can also comprise a flow meter (not shown) that is operably coupled with the second actuatable mechanism 140. The flow meter determines the volume of liquid that has flowed through the conduit 62 and into the actuatable valve 100. The flow meter can actuate a solenoid 158 that is operably coupled with the release 156 that holds the earth magnet 150 in the non-actuating position. The flow meter and the second actuatable mechanism 140, including the stopper 142, can be thought of collectively as a volumetric flow limiter, with the flow meter operably coupled to the second actuatable mechanism 140 and the second actuatable mechanism 140 operably coupled to the stopper 142.

Turning now to the operation of the actuatable valve 100, when the cycle of operation of the dishwasher 10 requires that liquid be added to the tub 18, the controller 14 causes the electrically energizable coil 130 of the first actuatable mechanism 120 to be energized. When the coil 130 is energized, it effects the movement of the slidable shaft 126 from the closed position, as shown in FIG. 3, to the opened position, where the stopper 122 is moved away from the outlet 104 and liquid within the interior 106 of the actuatable valve 100 is permitted to flow through the outlet 104 of the actuatable valve 100 and into the tub 18. When the desired amount of liquid has entered the tub 18, the controller 14 of the dishwasher 10 causes the energizing of the coil 130 to stop. When the coil 130 is no longer energized, the return spring 128 biases the slidable shaft 126 back to the original, closed position, and liquid is no longer permitted to flow through the outlet 104 of the actuatable valve 100. Thus, the selective operation of the first actuatable mechanism 120 is directed by the controller 14.

However, in the case that a malfunction occurs in the first actuatable mechanism 120, the quantity of liquid that enters the tub 18 can be greater than desired. In order to avoid this, the second actuatable mechanism 140, along with the flow meter, can act as a volumetric flow limiter to prevent the subsequent flow of liquid through the actuatable valve 100 if the first actuatable mechanism 120 does not function as desired to prevent the flow of liquid through the outlet 104 of the actuatable valve 100. The function of the volumetric flow limiter is to shut off the flow of water through the actuatable valve 100 after the quantity of water flowing through the actuatable valve 100 has passed a predetermined volume. The predetermined volume can be any suitable volume that is greater than the fill volume for the automatic cycle of operation, and less than a predetermined threshold. The predetermined threshold and/or the predetermined volume can be empirically determined values and can be stored in the memory 64 of the controller 14.

When the flow meter determines that the volume of water that has flowed through the actuatable valve 100 passes the predetermined volume, the second actuatable mechanism 140 functions to close the actuatable valve 100. This is accomplished when the flow meter determines that the volume of water flowing through the actuatable valve 100 has exceeded the predetermined volume and actuates a solenoid 158. The solenoid 158 is actuated to move in the direction of the arrow 134, coming into contact with the release 156. As pressure is applied to the lower end 160 of the release 156 via the solenoid 158, the release 156 pivots about a pivot point 136. This pivoting causes the upper end 162 of the release 156 to be moved away from the earth magnet 150. With the release 156 no longer holding the earth magnet 150 in the non-actuating position, the earth magnet 150 is free to be biased by the spring 152 into upward movement from the non-actuating position, as shown in FIG. 3, to the actuating position. When the earth magnet 150 is permitted to move upward along the slidable shaft 146 to the actuating position, the earth magnet 150 then effects movement of the slidable shaft 146 such that the stopper 142 is moved downward in order to prevent further flow of liquid through the interior 106 of the actuatable valve 100.

While the second actuatable mechanism 140 is described as being under the control of a flow meter that is integral with the actuatable valve 100, it is also contemplated that actuation of the solenoid 158 and the second actuatable mechanism 140 can also be under the control of any other flow detection system, sensor, or feature that may be a part of or a separate part from the actuatable valve 100. The actuatable valve 100 can also include a reset feature that would return the slidable shaft 146, the earth magnet 150, and the release 156 back to the non-actuating position for subsequent operation.

Figure 4:
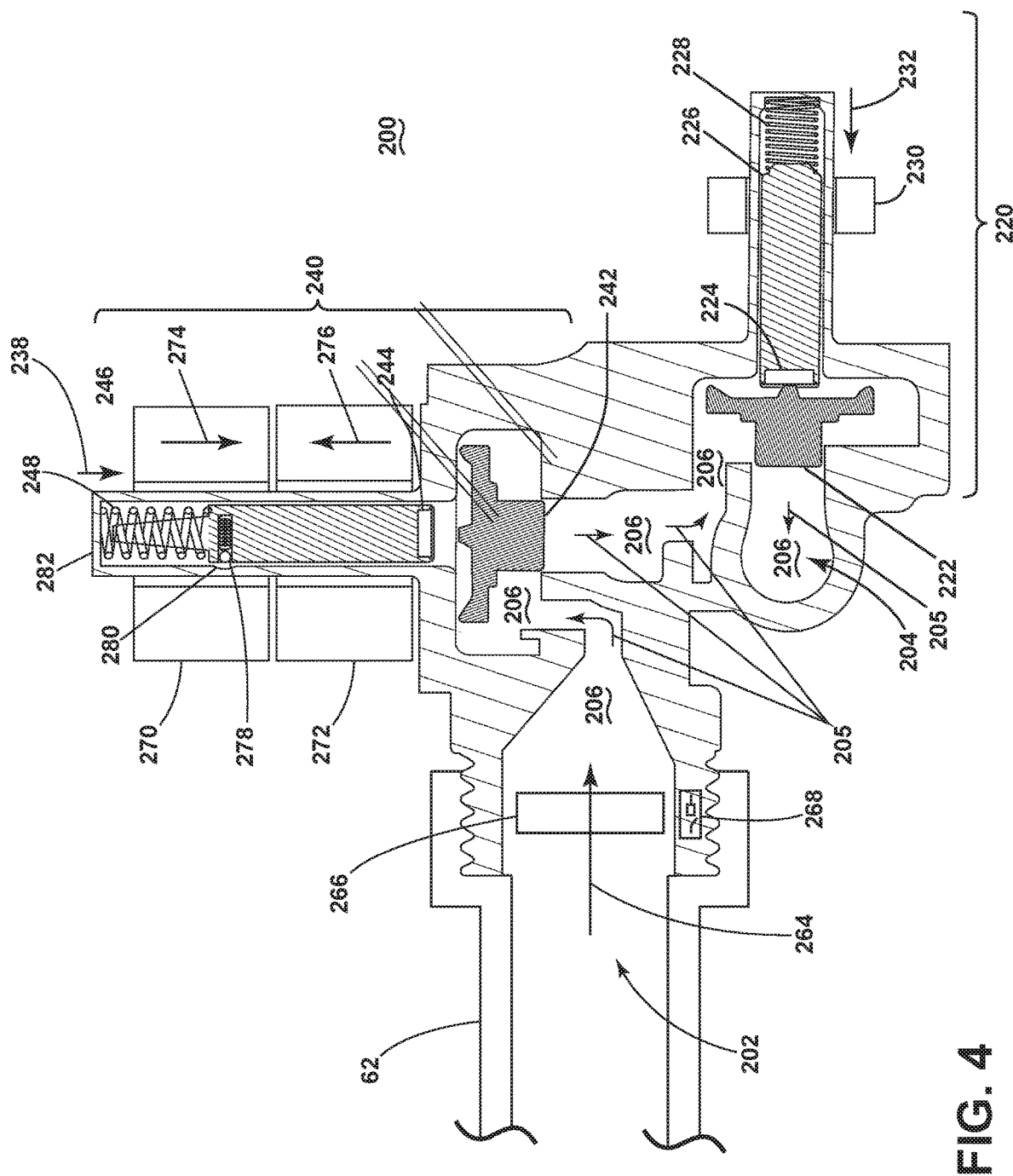
FIG. 4 is a schematic, cross-sectional view of an actuatable valve for use in the dishwasher of FIG. 1 according to a second embodiment of the invention.

Referring now to FIG. 4, a schematic, cross-sectional view of an actuatable valve 200 according to a second embodiment of the invention is illustrated. The actuatable valve 200 as illustrated in FIG. 4 is similar to the actuatable valve 100 of FIG. 3. Therefore, elements in the actuatable valve 200 similar to those of the actuatable valve 100 will be numbered with the prefix 200.

The actuatable valve 200 has an inlet 202 that is fluidly coupled with the conduit 62 and allows liquid to enter the actuatable valve 200. The liquid that enters through the inlet 202 follows a flow path indicated by the arrow 264 and flows through a flow meter, illustrated as a turbine 266. While the flow meter is illustrated herein as a turbine 266, it is also contemplated that any suitable type of flow meter can be used. The turbine 266 is provided with and operably coupled with a reed switch 268. It will also be understood that any other suitable type of switch or actuator can be used in place of or in addition to the reed switch 268.

The liquid that passes through the turbine 266 can follow a flow path 205 defined by the interior 206 of the actuatable valve 200 to reach the outlet 204. The outlet 204 is fluidly coupled with the tub 18 of the dishwasher 10 such that liquid that passes through the outlet 204 of the actuatable valve 200 can then enter the tub 18. The actuatable valve 200 comprises a first actuatable mechanism 220 and a second actuatable mechanism 240, both of which can selectively control the flow of liquid through the actuatable valve 200 and into the tub 18. The first actuatable mechanism 220 is identical in structure and function to the first actuatable mechanism 120 as described in FIG. 3 and will not be described further herein.

The second actuatable mechanism 240 can function as a failsafe in the case that the first actuatable mechanism 220 does not function properly and allows too much liquid to flow to the outlet 204 of the actuatable valve 200. The second actuatable mechanism 240 comprises a stopper 242, a plunger 244, and a slidable shaft 246 arranged in the same structure as in the first actuatable mechanism 220. The second actuatable mechanism 240 is also provided with a return spring 248 that exerts its force in the direction of the arrow 238, biasing the slidable shaft 246, the plunger 244, and the stopper 242 to a closed, or actuating position, as shown in FIG. 4, which prevents the flow of liquid through the interior 206 of the actuatable valve 200. A first coil 270 is provided circumferentially about the slidable shaft 246. More specifically, the first coil 270 is located circumferentially about an upper portion of the slidable shaft 246, nearest the return spring 248. A second coil 272 is provided circumferentially about a lower portion of the slidable shaft 246, at the end furthest from the return spring 248. The slidable shaft 246 is also provided with a spring-biased detent 278 which protrudes from the slidable shaft 246 and engages with a complementary indentation 280 that is provided in the inner surface of the housing 282 that surrounds the slidable shaft 246. The spring biased detent 278 serves to hold the slidable shaft 246 into a locked position in which liquid is permitted to flow through the interior 206 of the actuatable valve 200 and through the outlet 204.

Turning now to the operation of the actuatable valve 200, the operation of the first actuatable mechanism 220 is identical to the operation of the first actuatable mechanism 120 as described in FIG. 3 and will not be described further here. Under standard operating conditions, with the first actuatable mechanism 220 functioning as directed, liquid flows through the conduit 62, in the inlet 202 of the actuatable valve 200, through the turbine 266, and through the interior 206 of the actuatable valve 200. In these standard conditions, the slidable shaft 246 of the second actuatable mechanism 240 is in the non-actuating position, allowing liquid to flow past the second actuatable mechanism 240. Although the return spring 248 exerts force in the direction of the arrow 238 and biases the slidable shaft 246 towards the interior 206 of the actuatable valve, the spring biased detent 278 that protrudes from the slidable shaft 246 is engaged with the indentation 280 in the housing 282 and has sufficient strength to hold the slidable shaft 246 in a non-actuating, or opened, position. Neither the first coil 270 nor the second coil 272 are energized under standard operating conditions. Under control of the first actuatable mechanism 220, the liquid can then selectively flow through the outlet 204 of the actuatable valve 200 and into the tub 18 of the dishwasher 10.

In the case that the first actuatable mechanism 220 is not functioning properly and does not block the flow of liquid to the outlet 204 when directed, liquid may flow unchecked through the outlet 204 and into the tub 18. As the liquid flows through the turbine 266, the turbine 266 is rotated by the flow. The direction of the rotation is determined by the angle of the blades (not shown) of the turbine 266. The turbine 266 can rotate in a single direction for a predetermined number of rotations. The predetermined number of rotations corresponds to the predetermined volume of water that is allowed to flow through the actuatable valve 200 and is less than the predetermined threshold as described in FIG. 3. When the volume of water that has flowed past the turbine 266 has passed the predetermined volume, the reed switch 268 with which the turbine 266 is operably coupled, is actuated to cause electrical energizing of the first coil 270 of the second actuatable mechanism 240. In an exemplary embodiment, the reed switch 268 can be actuated with each complete revolution of the turbine 266, with electrical energizing of the first coil 270 occurring only after the reed switch 268 has been actuated a predetermined number of times without pause. The number of actuations of the reed switch 268 required to cause electrical energizing of the first coil 270 can correspond to the predetermined number of rotations of the turbine 266 that correspond to the predetermined volume of water that is allowed to flow through the actuatable valve 200. It will be understood that the reed switch 268 can also be configured to cause electrical energizing of the first coil 270 after only a single actuation of the reed switch 268, which can occur only after the predetermined number of rotations of the turbine 266, or any other suitable method of operation. While the flow meter is illustrated herein as a turbine 266 coupled with a reed switch 268, any suitable type of flow meter and actuating mechanism can be used in order to cause actuation of the second actuatable mechanism 240.

Actuation of the reed switch 268 the predetermined number of times without a pause results in electrical energizing of the first coil 270 of the second actuatable mechanism 240. The magnetic field that is created when the first coil 270 is electrically energized causes the spring biased detent 278 to be compressed, allowing the return spring 248 to bias the slidable shaft downward, in the direction of the arrow 274, moving the stopper 242 further into the interior 206 of the actuatable valve 200 and closing off subsequent flow of liquid through the outlet 204 of the actuatable valve 200. The second actuatable mechanism 240 can also be provided with a reset function in the form of the second coil 272. When the second coil 272 is electrically energized, movement of the slidable shaft 246 is effected in an upward direction, in accordance with the arrow 276, causing the slidable shaft 246 to move back into the non-actuating position, where the spring biased detent 278 engaged with the indentation 280 to hold the slidable shaft 246 in place and allow the flow of liquid through the interior 206 of the actuatable valve 200 and through the outlet 204 into the tub 18.

Figure 5:
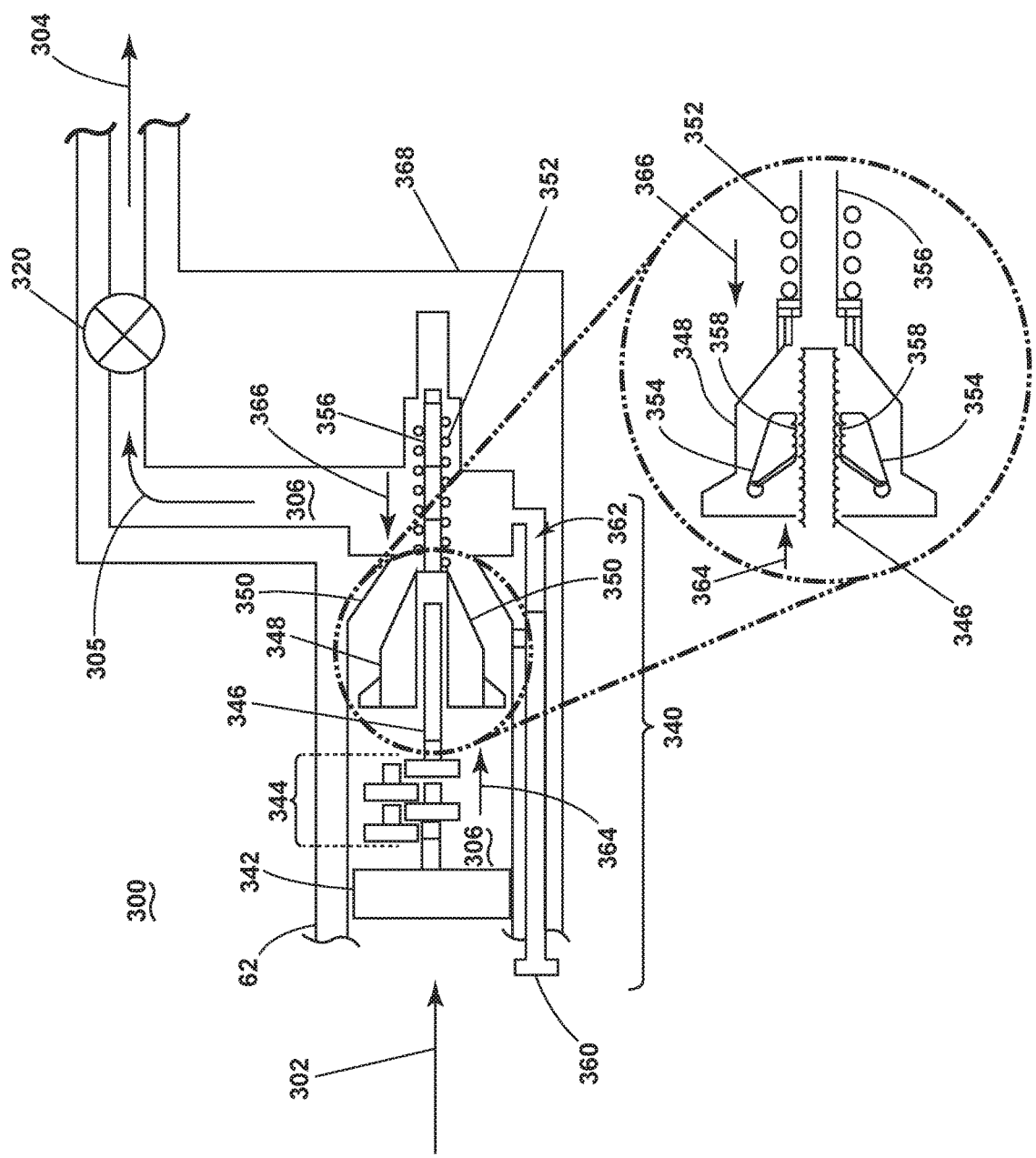
FIG. 5 is a schematic, cross-sectional view of an actuatable valve for use in the dishwasher of FIG. 1 according to a third embodiment of the invention.

Referring now to FIG. 5, a schematic, cross-sectional view of an actuatable valve 300 according to a third embodiment of the invention is illustrated. In this exemplary embodiment, the actuatable valve 300 has a mechanical actuating means that operates without the use of solenoids, switches, or electrical energization as in previous embodiments. The actuatable valve 300 comprises a volumetric flow limiter 340, illustrated herein as being located upstream of a separate actuatable mechanism 320 that is directed to selectively permit the flow of liquid to the tub 18 by the controller 14. The separate actuatable mechanism 320 can be thought of as being analogous to the first actuatable mechanisms 120 (FIG. 3), 220 (FIG. 4), while the volumetric flow limiter 340 of FIG. 5 can be thought of as being analogous to the second actuatable mechanisms 140 (FIG. 3), 240 (FIG. 4). While the volumetric flow limiter 340 is illustrated herein as being separate from the actuatable mechanism 320, it will be understood that the two structures can be provided integrated together into a single valve, in separate locations along the conduit 62, or in any other suitable arrangement with one another.

The actuatable valve 300 has an inlet 302 through which liquid can enter the actuatable valve 300 from the conduit 62. The volumetric flow limiter 340 is provided within the actuatable valve 300 and comprises a flow meter, which is illustrated herein as a turbine 342. The turbine 342 is operably connected to a reducing gear system 344 that is in turn operably connected to a threaded output shaft 346. The threaded output shaft 346 serves as an actuator within the volumetric flow limiter 340. The volumetric flow limiter 340 further comprises a stopper, illustrated herein as a wedge 348 having a shaft 356 protruding therefrom. The wedge 348 is provided circumferentially about and threadably mounted to the threaded output shaft 346. The wedge 348 is complementary in structure to a stopper seat 350 against which the wedge 348 can seal. A return spring 352 is provided circumferentially about the shaft 356 that protrudes from the wedge 348. The return spring 352 exerts force on the wedge 348 in the direction of the arrow 366. Within the wedge 348 are provided deflectable wedge elements 354 that have a threaded inner surface 358 that is complementary to the threaded output shaft 346. A release pin 360 can also be provided that is inserted within a channel 362 in the housing 368 of the actuatable valve 300 that runs alongside the volumetric flow limiter 340.

Turning now to the operation of the actuatable valve 300, liquid flows from the conduit 62 through the inlet 302 of the actuatable valve 300. The liquid then flows through the turbine 342 and into the interior 306 of the actuatable valve 300 along a flow path 305. As the liquid flows through the turbine 342, the turbine 342 is rotated by the liquid passing through the actuatable valve 300. The rotation of the turbine 342 in turn drives rotation of the reducing gear system 344, which causes the threaded output shaft 346 to rotate with the turbine 342. As the liquid flows through the interior 306 of the actuatable valve 300, force is applied against the wedge 348 in the direction of the arrow 364. The force of the liquid in the direction of the arrow 364 is greater than the force generated by the return spring 352 in the direction of the arrow 366, resulting in a downward force being applied to the deflectable wedge elements 354. This downward force causes the deflectable wedge elements 354 to move in such a way that the threads of the threaded inner surfaces 358 are deflected toward the threaded output shaft 346, causing the threaded inner surfaces 358 of the deflectable wedge elements 354 to enmesh with the threads of the threaded output shaft 346 in response to water flowing through the actuatable valve 300. Once this occurs, the wedge 348 will be moved in the direction of the arrow 364, towards the stopper seat 350, as the threaded output shaft 346 continues to rotate. The reducing gear system 344 is designed such that once the amount of liquid that has flowed through the turbine 342 passes the predetermined volume, the wedge 348 will come into contact with the stopper seat 350, sealing off the interior 306 of the actuatable valve 300 and preventing further flow of liquid to the outlet 304 of the actuatable valve 300. In this way, the volumetric flow limiter 340 acts to ensure that the volume of liquid that enters the tub 18 does not exceed the predetermined threshold.

In the case that the flow of liquid through the outlet 304 of the actuatable valve 300 ceases prior to the predetermined volume being reached, as under standard operating conditions and proper functioning for normal closing of the actuatable valve 300, the force of the liquid flow in the direction of the arrow 364 is no longer sufficient to overcome the biasing force of the return spring 352, and the wedge 348 will be moved back in the direction of the arrow 366 to the start position. As this movement occurs, the deflectable wedge elements 354 will rotate upwards, disengaging with the threaded output shaft 346 and returning to the start position. The volumetric flow limiter 340 can also be provided with a release pin 360. When the release pin 360 is pulled backwards, away from the wedge 348, liquid is permitted to flow through the channel 362 in the housing 368 of the actuatable valve. This equalizes the force exerted by the liquid in the direction of the arrow 364 against the wedge 348, allowing the return spring 352 to bias the wedge 348 back to the start position.

The embodiments described herein can be used to volumetrically limit the flow of liquid through an actuatable valve in a dishwasher, ensuring that the volume of liquid that enters the tub of the dishwasher does not exceed a predetermined threshold. These embodiments can be used to avoid the undesirable condition of excess amounts of liquid being present in the tub of the dishwasher if the portion of the valve that is directed to selectively allow the flow of liquid into the tub under the control of the controller should fail to close and prevent further flow of liquid into the tub when signaled by the controller.

To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of supplying water to a dishwasher operable according to an automatic cycle of operation, the method comprising:
supplying a flow of water to a tub of the dishwasher through an actuatable valve fluidly controlling the flow of water to the tub and having a mechanically actuated volumetric flow limiter; and
shutting off the flow of water through the actuatable valve without the use of electricity after the mechanically actuated flow limiter determines the passing of a predetermined volume of water through the actuatable valve upon an actuation of the actuatable valve;
wherein the determining the passing of the predetermined volume of water through the actuatable valve comprises determining an amount of water passing through the actuable valve with a flow meter located within the actuatable valve.

2. The method of claim 1 wherein the predetermined volume is less than a predetermined threshold.

3. The method of claim 2 wherein the predetermined threshold is greater than a fill volume for the automatic cycle of operation.

4. The method of claim 1 wherein the shutting off the flow of water comprises moving an actuator within the actuatable valve in response to the amount of water determined by the flow meter.

5. The method of claim 4 wherein the shutting off the flow of water further comprises moving a stopper within the actuatable valve in response to the moving of the actuator.

6. A method of supplying water to a dishwasher operable according to an automatic cycle of operation, the method comprising:
supplying a flow of water to a tub of the dishwasher through an actuatable valve fluidly controlling the flow of water to the tub and having a mechanically actuated volumetric flow limiter; and
shutting off the flow of water through the actuatable valve without the use of electricity after the mechanically actuated flow limiter determines the passing of a predetermined volume of water through the actuatable valve upon an actuation of the actuatable valve;
wherein the determining the passing of the predetermined volume of water comprises flowing water through a turbine located within the actuatable valve to effect a rotation of the turbine.

7. The method of claim 6 further comprising the rotation of the turbine rotating a threaded output shaft.

8. The method of claim 7 further comprising the rotation of the threaded output shaft axially moving a wedge threadably mounted to the threaded output shaft.

9. The method of claim 8 further comprising stopping the flow of water through the actuatable valve by axially advancing the wedge until the wedge seats against a stopper seat within the actuatable valve.

10. The method of claim 9 further comprising releasing the wedge from the stopper seat and returning the wedge to a start position where the wedge is spaced from the stopper seat and the actuatable valve is open.

11. The method of claim 10 wherein the releasing the wedge from the stopper seat and returning the wedge to the start position further comprises deflecting at least a portion of the wedge to enmesh with the threaded output shaft when water is flowing through the actuatable valve and is deflected away from the threaded output shaft to disengage from the threaded output shaft when water does not flow through the actuatable valve.

12. The method of claim 11 wherein the release further comprises biasing the at least a portion of the wedge along the threaded output shaft to the start position.

13. The method of claim 6 wherein the predetermined volume is less than a predetermined threshold.

14. The method of claim 13 wherein the predetermined threshold is greater than a fill volume for the automatic cycle of operation.

15. A method of supplying water to an appliance operable according to an automatic cycle of operation, the method comprising:
supplying a flow of water to the appliance through an actuatable valve fluidly controlling the flow of water to the appliance and having a mechanically actuated volumetric flow limiter; and
shutting off the flow of water through the actuatable valve without the use of electricity after the mechanically actuated flow limiter determines the passing of a predetermined volume of water through the actuatable valve upon an actuation of the actuatable valve;
wherein the determining the passing of the predetermined volume of water through the actuatable valve comprises determining an amount of water passing through the actuable valve with a flow meter located within the actuatable valve.

16. The method of claim 15 wherein the predetermined volume is less than a predetermined threshold.

17. The method of claim 16 wherein the predetermined threshold is greater than a fill volume for the automatic cycle of operation.

18. The method of claim 15 wherein the shutting off the flow of water comprises moving an actuator within the actuatable valve in response to the amount of water determined by the flow meter.

19. The method of claim 18 wherein the shutting off the flow of water further comprises moving a stopper within the actuatable valve in response to the moving of the actuator.

* * * * *